United States Patent
Yamazaki et al.

(10) Patent No.: US 9,624,606 B2
(45) Date of Patent: Apr. 18, 2017

(54) METHOD FOR PRODUCING CELLULOSE NANOFIBER, CELLULOSE NANOFIBER, MASTER BATCH, AND RESIN COMPOSITION

(71) Applicant: DIC Corporation, Tokyo (JP)

(72) Inventors: Takeshi Yamazaki, Sakura (JP); Takahito Ikuma, Sakura (JP); Tetsuya Harada, Sakura (JP); Tetsuya Yamazaki, Ichihara (JP); Mari Minowa, Ichihara (JP); Masakazu Yoshizawa, Ichihara (JP)

(73) Assignee: DIC Corporation, Tokyo (JP)

( * ) Notice: Subject to any disclaimer, the term of this patent is extended or adjusted under 35 U.S.C. 154(b) by 47 days.

(21) Appl. No.: 14/388,188

(22) PCT Filed: Mar. 28, 2013

(86) PCT No.: PCT/JP2013/059341
§ 371 (c)(1),
(2) Date: Sep. 25, 2014

(87) PCT Pub. No.: WO2013/147062
PCT Pub. Date: Oct. 3, 2013

(65) Prior Publication Data
US 2015/0087750 A1    Mar. 26, 2015

(30) Foreign Application Priority Data

Mar. 28, 2012 (JP) ................. 2012-073771

(51) Int. Cl.
| | | |
|---|---|---|
| *D01F 2/00* | (2006.01) | |
| *C08G 59/18* | (2006.01) | |
| *C08G 59/42* | (2006.01) | |
| *C08G 59/68* | (2006.01) | |
| *C08J 3/205* | (2006.01) | |
| *D01F 6/74* | (2006.01) | |
| *C08J 3/22* | (2006.01) | |
| *C08J 5/04* | (2006.01) | |

(52) U.S. Cl.
CPC ............ *D01F 2/00* (2013.01); *C08G 59/186* (2013.01); *C08G 59/4215* (2013.01); *C08G 59/686* (2013.01); *C08J 3/2053* (2013.01); *C08J 3/22* (2013.01); *C08J 5/045* (2013.01); *D01F 6/74* (2013.01); *C08J 2363/00* (2013.01); *C08J 2463/00* (2013.01); *D10B 2201/20* (2013.01)

(58) Field of Classification Search
CPC .................. C08L 63/00; D01F 2/00
See application file for complete search history.

(56) References Cited

U.S. PATENT DOCUMENTS

| | | | | |
|---|---|---|---|---|
| 4,292,214 A * | 9/1981 | Blount | ...................... | C08B 1/08 523/400 |
| 4,352,902 A * | 10/1982 | Nakayama | ............ | C08F 251/02 524/36 |
| 4,404,347 A * | 9/1983 | Nakamura | ............. | C08G 18/10 527/300 |
| 4,435,531 A * | 3/1984 | Nakayama | ........... | C09D 151/02 524/37 |
| 5,273,772 A * | 12/1993 | Cooper | .................. | A23D 9/013 426/611 |
| 6,258,304 B1 * | 7/2001 | Bahia | ......................... | C08J 5/18 264/171.1 |
| 6,475,419 B1 * | 11/2002 | Lagarden | .................. | D01F 2/06 106/166.42 |
| 8,735,470 B2 * | 5/2014 | Takizawa | ................. | C08J 3/226 524/35 |
| 2001/0004495 A1 * | 6/2001 | Itoyama | .................... | D01F 2/10 428/393 |
| 2003/0091754 A1 * | 5/2003 | Chihani | ................... | D04H 1/42 427/580 |
| 2003/0168401 A1 * | 9/2003 | Koslow | .................. | A01N 25/26 210/500.25 |
| 2011/0001904 A1 * | 1/2011 | Tachikawa | ................ | C08B 3/06 349/96 |
| 2015/0005413 A1 * | 1/2015 | Yamazaki | .................. | C08J 5/04 523/447 |
| 2015/0171395 A1 * | 6/2015 | Ikuma | ................ | B01D 67/0027 429/249 |
| 2015/0232612 A1 * | 8/2015 | Tajiri | ................... | C08G 63/199 106/170.33 |

FOREIGN PATENT DOCUMENTS

| | | | |
|---|---|---|---|
| JP | 2005-042283 A | 2/2005 | |
| JP | 2008-297364 A | 12/2008 | |
| JP | 2009-261993 A | 11/2009 | |
| WO | WO-2011/125801 A1 | 10/2011 | |

OTHER PUBLICATIONS

International Search Report mailed Jun. 25, 2013, issued for PCT/JP2013/059341.

* cited by examiner

*Primary Examiner* — Megan McCulley
(74) *Attorney, Agent, or Firm* — Locke Lord LLP

(57) ABSTRACT

The present invention provides a method for producing cellulose nanofibers, the method including fibrillating cellulose in a modified epoxy resin (A) having a hydroxyl value of 100 mgKOH/g or more. Also, the present invention provides cellulose nanofibers produced by the production method and a master batch containing the cellulose nanofibers and the modified epoxy resin (A). Further, present invention provides a resin composition containing the master batch and a curing agent (D), and provides a molded product produced by molding the resin composition.

16 Claims, No Drawings

METHOD FOR PRODUCING CELLULOSE NANOFIBER, CELLULOSE NANOFIBER, MASTER BATCH, AND RESIN COMPOSITION

TECHNICAL FIELD

The present invention relates to cellulose nanofibers used as high functional filler capable of forming composites with various resins, a master batch and resin composition which contain cellulose nanofibers, and a method for fibrillating cellulose.

BACKGROUND ART

Cellulose nanofibers which have been recently developed are nanofiller composed of plant-derived natural raw materials and attract attention as low-specific-gravity and high-strength composite materials for resins.

However, in order to fibrillate cellulose having many hydroxyl groups up to a nano-level, in view of the current technology, it is necessary to fibrillate cellulose in water or fibrillate a mixture of a resin with a large amount of water, and thus cellulose nanofibers after fibrillation contain a large amount of water (refer to Patent Literature 1). In order to produce composites of the hydrated fibrillated cellulose nanofibers with various resins, a step of dehydrating the produced cellulose nanofibers is required. In addition, cellulose easily forms intermolecular hydrogen bonds, and thus re-aggregation takes place in the step of dehydrating cellulose nanofibers, thereby degrading dispersion in a resin.

In order to resolve the problems, a technique of fibrillating cellulose in an organic solvent, not in water, to produce cellulose nanofibers is reported (refer to Patent Literature 2). This technique decreases drying cost because water is not required, but in order to form a composite with a resin, a step of dispersing cellulose in an organic solvent and then removing the organic solvent after fibrillation is required, and a complicated process for producing nanofibers is not yet improved.

That is, there is demand for establishing a technique capable of forming composites of cellulose nanofibers with various resins by a low-cost simple process.

CITATION LIST

Patent Literature

PTL 1: Japanese Unexamined Patent Application Publication No. 2005-42283
PTL 2: Japanese Unexamined Patent Application Publication No. 2009-261993

SUMMARY OF INVENTION

Technical Problem

A problem of the present invention is to establish a novel production method without using water or an organic solvent for fibrillating cellulose and without requiring a dehydration and drying step, and to provide cellulose nanofibers which are easily formed into composites with resins, and a high-strength resin composition and molded product which use the cellulose nanofibers.

Solution to Problem

As a result of repeated intensive research, the inventors found that cellulose can be fibrillated directly in a modified epoxy resin without using water or an organic solvent. Also, it was found that cellulose nanofibers and a master batch produced by the method can be directly formed into composites with other resins for dilution without requiring modification of cellulose or the like. It was further found that a curable resin composition is produced by adding a curing agent to a master batch produced by the method.

That is, the present invention provides a method for producing cellulose nanofibers, the method including fibrillating cellulose in a modified epoxy resin (A) having a hydroxyl value of 100 mgKOH/g or more.

Advantageous Effects of Invention

According to the present invention, cellulose can be directly fibrillated in a modified epoxy resin (A) without using water or an organic solvent. Further, cellulose nanofibers and a master batch produced by the method can be directly formed into composites with other resins for dilution without requiring an operation of removing water or an organic solvent, and a resin composition composite with simple and good cellulose nanofibers can re produced. In addition, a molded product can be produced by adding a curing agent to the resultant resin composition, and a high-strength molded product can be produced by the effect of the cellulose nanofibers.

DESCRIPTION OF EMBODIMENTS

An embodiment of the present invention is described in detail below. Description below relates to an example of the embodiment of the present invention, and the present invention is not limited to the description.

[Type of Cellulose]

Cellulose nanofibers of the present invention can be produced by fibrillating various types of cellulose and can be used as a resin strengthening agent which can enhance a fracture toughness value of a resin and the like when contained in the resin. Cellulose in the present invention may be any cellulose as long as it can be used as a fibrillation material, and pulp, cotton, paper, regenerated cellulose fibers such as rayon, cupra, polynosic, acetate, and the like, and animal-derived cellulose such as bacteria-produced cellulose, sea squirt, and the like can be used. Further, if required, surfaces of the cellulose may be chemically modified.

Both wood pulp and non-wood pulp can be preferably used as pulp. The wood pulp includes mechanical pulp and chemical pulp, and chemical pulp having a low lignin content is more preferred. Examples of chemical pulp include sulfide pulp, kraft pulp, alkali pulp, and the like, and any one of these can be preferably used. Examples of non-wood pulp include straw, bagasse, kenaf, bamboo, reed, paper mulberry, flax, and the like, and any one of these can be used.

Cotton is a plant mainly used for clothing fibers, and any one of cotton, cotton fibers, and cotton fabrics can be used.

Paper is produced by extracting fibers from pulp and performing papermaking, and wastepaper such as newspaper, waste milk pack, used copy paper, and the like can be preferably used.

In addition, a cellulose powder produced by crushing cellulose to have a certain grain size distribution may be used as cellulose as a fibrillation material, and examples of the cellulose powder include KC Flock manufactured by Nippon Paper Chemicals Co. Ltd., Ceolus manufactured by Asahi Kasei Chemicals Corporation, Avicel manufactured by FMC Corporation, and the like.

[Modified Epoxy Resin (A) Having Hydroxyl Value of 100 mgKOH/g or More]

The cellulose fibers used in the present invention can be produced by fibrillating cellulose in a modified epoxy resin (A) having a hydroxyl value of 100 mgKOH/g or more.

The modified epoxy resin (A) having a hydroxyl value of 100 mgKOH/g or more in the present invention is a resin and compound containing an epoxy group and having a hydroxyl value of 100 mgKOH/g or more. The modified epoxy resin (A) can be produced by reacting an epoxy resin (B) with a compound (C) containing a carboxyl group or an amino group.

[Epoxy Resin (B)]

The structure and the like of the epoxy resin (B) used in the present invention are not particularly limited as long as it is a compound having an epoxy group in its molecule and reacts with the compound (C) having a carboxyl group or amino group described below to produce the modified epoxy resin (A) having a hydroxyl value of 100 mgKOH/g or more. Examples thereof include polyvalent epoxy resins such as bisphenol A epoxy resin, bisphenol F epoxy resin, bisphenol AD epoxy resin, bisphenol S epoxy resin, phenol novolac epoxy resin, cresol novolac epoxy resin, p-tert-butyl phenol novolac epoxy resin, nonylphenol novolac epoxy resin, tert-butyl catechol epoxy resin, and the like; monovalent epoxy resins such as a condensate of epihalohydrin and an aliphatic alcohol, such as butanol or the like, an aliphatic alcohol having 11 to 12 carbon atoms, or a monohydric phenol, such as phenol, p-ethylphenol, o-cresol, m-cresol, p-cresol, p-tert-butylphenol, sec-butylphenol, nonylphenol, xylenol, or the like, a condensate of epihalohydrin and a monovalent carboxyl group such as neodecanoic acid or the like; glycidyl amine epoxy resins such as a condensate of diaminodiphenylmethane and epihalohydrin, and the like; polyvalent aliphatic epoxy resins, for example, polyglycidyl ethers of vegetable oils such as soybean oil, castor oil, and the like; polyvalent alkylene glycol-type epoxy resins such as a condensate of epihalohydrin and ethylene glycol, propylene glycol, 1,4-butanediol, 1,6-hexanediol, glycerin, erithritol, polyethylene glycol, polypropylene glycol, polytetramethylene ether glycol, or trimethylolpropane; aqueous epoxy resins described in Japanese Unexamined Patent Application Publication No. 2005-239928; and the like. These may be used alone or in combination of two or more.

If required, the epoxy resin (B) may be liquefied/decreased in viscosity by adding an organic solvent, a nonreactive diluent, or the like.

[Compound (C) Having Carboxyl Group or Amino Group]

The compound (C) having a carboxyl group or amino group in the present invention may be any compound having a carboxyl group or amino group as long as it reacts with the epoxy resin (A) described above to produce the modified epoxy resin (A) having a hydroxyl value of 100 mgKOH/g or more, and at least any one of a compound (C1) having a carboxyl group, a compound (C2) having an amino group, and a compound (C3) having a carboxyl group and an amino group can be used.

The compound (C) having a carboxyl group or amino group is particularly preferably a compound (C4) having a carboxyl group or an amino group and further having a hydroxyl group because a high hydroxyl value can be imparted to the modified epoxy resin (A) by reaction with the epoxy compound (B).

[Compound (C1) Having Carboxyl Group]

The compound (C1) having a carboxyl group in the present invention is a compound having at least one carboxyl group. Specific examples of a compound having one carboxyl group include fatty acids such as formic acid, acetic acid, propionic acid, butanoic acid, pentanoic acid, hexanoic acid, heptanoic acid, octanoic acid, nonanoic acid, decanoic acid, chloroacetic acid, trifluoroacetic acid, isopropionic acid, isostearic acid, neodecanoic acid, and the like; aromatic carboxylic acids such as benzoic acid, methylbenzoic acid, dimethylbenzoic acid, trimethylbenzoic acid, phenylacetic acid, 4-isopropylbenzoic acid, 2-phenylpropionic acid, 2-phenylacrylic acid, 3-phenylpropionic acid, cinnamic acid, and the like. Specific examples of a compound having two or more carboxyl groups include carboxylic acids such as succinic acid, adipic acid, terephthalic acid, isophthalic acid, pyromellitic acid, and the like; and anhydrides thereof. Further examples include maleic acid, maleic anhydride, fumaric acid, itaconic acid, citraconic acid, chloromaleic acid, and esters thereof, halogenated maleic anhydride, α,β-unsaturated dibasic acids such as aconitic acid and the like, β,γ-unsaturated dibasic acids such as dihydromuconic acid and the like. Examples of saturated dibasic acids and anhydrides thereof include phthalic acid, phthalic anhydride, halogenated phthalic anhydride, isophthalic acid, terephthalic acid, nitrophthalic acid, tetrahydrophthalic acid, tetrahydrophthalic anhydride, endomethylene tetrahydrophthalic anhydride, halogenated phthalic anhydride, and esters thereof. Specific examples include hexahydrophthalic acid, hexahydrophthalic anhydride, hexahydroterephthalic acid, hexahydroisophthalic acid, 1,4-cyclohexanedicarboxylic acid, 1,3-cyclohexanedicarboxylic acid, methylhexahydrophthalic acid, HET acid, 1,1-cyclobutanedicarboxylic acid, oxalic acid, succinic acid, succinic anhydride, malonic acid, glutaric acid, adipic acid, azelaic acid, pimelic acid, suberic acid, azelaic acid, sebacic acid, 1,12-dodecane diacid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, and the like.

[Compound (C2) Having Amino Group]

The compound (C2) having an amino group in the present invention is a compound having at least one amino group. Specific examples of a compound having one amino group include methylamine, ethylamine, dimethylamine, diethylamine, propylamine, butylamine, N,N-dimethyl-2-propaneamine, aniline, toluidine, 2-aminoanthracene, and the like. Examples of a compound having two or more amino groups include ethylenediamine, 1,3-propanediamine, 1,4-butanediamine, 1,6-hexamethylenediamine, 1,4-cyclohexanediamine, 3-aminomethyl-3,5,5-trimethylcyclohexylamine, piperazine, 2,5-dimethylpiperazine, isophoronediamine, 4,4'-cyclohexylmethanediamine, norbornanediamine, hydrazine, diethylenetriamine, triethylenetriamine, 1,3-bis (aminomethyl)cyclohexane, xylylenediamine, and the like.

[Compound (C3) Having Carboxyl Group and Amino Group]

The compound (C3) having a carboxyl group and an amino group in the present invention is a compound having at least one each of a carboxyl group and an amino group. Typically, the compound is amino acid and may further contain a hydroxyl group. Specific examples include alanine, arginine, asparagine, aspartic acid, cysteine, glutamine, glutamic acid, glycine, histidine, isoleucine, leucine, lycine, methionine, phenylalanine, proline, serine, threonine, tryptophane, tyrosine, valine, aminobutyric acid, theanine, tricholomic acid, kainic acid, and the like.

[Compound (C4) Having Carboxyl Group or Amino Group and Further Having Hydroxyl Group]

The compound (C4) having a carboxyl group or an amino group and further having a hydroxyl group is a compound having a carboxyl group r an amino group and further having at least one hydroxyl group. Specific examples include glycolic acid, glyceric acid, hydroxypropionic acid, hydroxybutyric acid, malic acid, 2,3-dihydroxybutane diacid, citric acid, isocitric acid, mevalonic acid, bantoin acid, ricinoleic acid, dimethylolpropionic acid, dimethylolbutanoic acid, hydroxyphenylpropionic acid, mandelic acid, benzilic acid, hydroxymethylamine, hydroxyethylamine, hydroxypropylamine, and the like.

[Production of Modified Epoxy Resin (A)]

The modified epoxy resin (A) having a hydroxyl value of 100 mgKOH/g or more in the present invention can be produced by reaction between an epoxy group of the epoxy resin (B) and a carboxyl group or an amino group of the compound (C) having a carboxyl group or an amino group. A hydroxyl value of less than 100 mgKOH/g is undesired because fibrillation to cellulose nanofibers little proceeds due to low affinity for cellulose. The reaction ratio between an epoxy group and a carboxyl group or an amino group may be determined to any desired value so as to produce a hydroxyl value of 100 mgKOH/g or more and leave a desired mount of epoxy groups.

The amount of epoxy groups in the modified epoxy resin (A) is preferably 0.3 or more, more preferably 0.5 or more, and most preferably 1 or more per molecule.

The modified epoxy resin can be produced without using a solvent or in a solvent. The solvent-less reaction without the need to remove a solvent is preferred.

The polymerization solvent used is not particularly limited. Examples thereof include methanol, ethanol, isopropanol, 1-butanol, tertiary butanol, isobutanol, diacetone alcohol, acetone, methyl ethyl ketone, diethyl ketone, methyl isobutyl ketone, cyclohexanone, dibutyl ether, tetrahydrofuran, dioxane, ethylene glycol monomethyl ether, diethylene glycol monomethyl ether, diethylene glycol monoethyl ether, diethylene glycol diethyl ether, butyl cellosolve, toluene, xylene, ethyl acetate, isobutyl acetate, and the like. These solvents may be used alone or as a mixture.

Also, a Lewis acid catalyst or Lewis base catalyst may be used as a reaction catalyst. Specific examples thereof include boron trifluoride, benzyltrimethyl ammonium chloride, dimethylaminopyridine, pyridine, 8-diazabicyclo[5.4.0]undec-7-ene, triphehylphosphine, and the like.

The reaction temperature is preferably between room temperature and 200° C.

[Production of Cellulose Nanofibers in Modified Epoxy Resin (A)]

In the present invention, cellulose nanofibers can be produced by adding cellulose in the modified epoxy resin (A) and applying mechanical shearing force. Means for applying shearing force uses a known kneading machine or the like, such as a beads mill, an ultrasonic homogenizer, an extruder such as a single-screw extruder, a double-screw extruder, or the like, a Banbury mixer, a grinder, a pressure kneader, a two-roll mill, or the like. Among these, the pressure kneader is preferably used from the viewpoint that stable shearing force can be applied in a resin with high viscosity.

Cellulose is formed into cellulose nanofibers by a fibrillation method of the present invention. The fibrillation method of the present invention is capable of fibrillation to 100 nm to 1,000,000 nm in a long-axis direction and 5 nm to 1,000 nm in a short-axis direction.

In the present invention, a ratio between the modified epoxy resin (A) and cellulose can be arbitrarily changed. When a curing agent (D) and/or a diluent resin is further mixed after fibrillation, at a somewhat high concentration of cellulose in the modified epoxy resin (A), the effect of strengthening a resin can be more exhibited. On the other hand, at an excessively low ratio of the modified epoxy resin (A), the satisfactory effect of fibrillating cellulose cannot be achieved. The ratio of cellulose in a composition containing the cellulose and the modified epoxy resin (A) is 10% by mass to 90% by mass, preferably 30% by mass to 80% by mass, and more preferably 40% by mass to 70% by mass.

[Master Batch]

The cellulose nanofibers fibrillated in the modified epoxy resin (A) can be used directly as a master batch without being subjected to a purification step. Also, the master batch containing the curing agent (D) added thereto may be used as a resin composition of the present invention for directly producing a molded product.

The master batch of the present invention contains, as essential components, the modified epoxy resin (A) and the cellulose nanofibers produced by fibrillating cellulose, and various resins, additives, and organic and inorganic filler can be added to the master batch within a range where the effect of the present invention is not impaired. Various resins, additives, and organic and inorganic filler may be added before or after fibrillation of cellulose, but when the master batch is subsequently formed into a composite with the curing agent (D) and/or the dilution resin (E), it is undesired to necessitate an impurity removing step of drying and purification because the effect of the present invention is impaired.

[Curing Agent (D)]

In the present invention, a latent curing agent, a polyamine compound, a polyphenol compound, a cationic photoinitiator, and the like can be used as the curing agent.

Examples of the latent curing agent include dicyandiamide, hydrazide, imidazole compounds, amine adducts, sulfonium salts, onium salts, ketimine, acid anhydrides, tertiary amines, and the like. These latent curing agents are preferred because they provide one-part curable compositions and are easy to handle.

Examples of acid anhydrides include phthalic anhydride, trimellitic anhydride, pyromellitic anhydride, tetrahydrophthalic anhydride, hexahydrophthalic anhydride, maleic anhydride, succinic anhydride, and the like.

Examples of the polyamine compound include aliphatic polyamines such as ethylene diamine, diethylene triamine, triethylene tetramine, and the like; alicyclic polyamines such as menthene diamine, isophoronediamine, bis(4-amino-3-methylcyclohexyl)methane, bis(aminomethyl)cyclohexane, 3,9-bis(3-aminopropyl)-2,4,8,10-tetraoxaspiro[5,5]undecane, and the like; aliphatic amines having an aromatic ring, such as m-xylenediamine and the like; and aromatic polyamine such as m-phenylenediamine, 2,2-bis(4-aminophenyl)propane, diaminodiphenylmethane, diaminodiphenylsulfone, α,α-bis(4-aminophenyl)-p-diisopropylbenzene, and the like.

Examples of the polyphenol compound include phenol novolac, o-cresol novolac, tert-butylphenol novolac, dicyclopentadienecresol, terpenediphenol, terpenedicatechol, 1,1,3-tris(3-tertiary-butyl-4-hydroxy-6-methylphenyl)butane, butylidene bis(3-tertiary-butyl-4-hydroxy-6-methylphenyl), and the like.

The cationic photoinitiator is a compound capable of emitting a substance which initiates cationic polymerization by energy ray irradiation, and is particularly preferably a double salt or a derivative thereof, such as an onium salt which emits a Lewis acid by irradiation.

[Dilution Resin (E)]

A composition containing the master batch, which contains cellulose nanofibers, and the curing agent (D) can be mixed with a dilution resin (E). The dilution resin (E) may be added after the master batch and the curing agent (D) are mixed, the curing agent (D) may be mixed after the master batch and the dilution resin (E) are mixed, or the master batch, the curing agent (D), and the dilution resin (E) may be simultaneously mixed. The strength of a resin composition can be improved by mixing as a strengthening agent the master batch which contains cellulose nanofibers of the present invention with the dilution resin (E). The dilution resin (E) is not particularly limited as long as it can be mixed with the master batch, and it may be either a monomer or a polymer, and either a thermoplastic resin or a thermosetting resin can be used. In addition, one or combination of a plurality of resins may be used.

The thermoplastic resin is a resin which can be melt-molded by heating. Specific examples thereof include polyethylene resins, polypropylene resins, polystyrene resins, rubber-modified polystyrene resins, acrylonitrile-butadiene-styrene (ABS) resins, acrylonitrile-styrene (AS) resins, polymethyl methacrylate resins, acrylic resins, polyvinyl chloride resins, polyvinylidene chloride resins, polyethylene terephthalate resins, ethylene vinyl alcohol resins, cellulose acetate resins, ionomer resins, polyacrylonitrile resins, polyamide resins, polyacetal resins, polybutylene terephthalate resins, polylactic resins, polyphenylene ether resins, modified polyphenylene ether resins, polycarbonate resins, polysulfone resins, polyphenylene sulfide resins, polyether imide resins, polyether sulfone resins, polyarylate resins, thermoplastic polyimide resins, polyamide-imide resins, polyether ether ketone resins, polyketone resins, liquid crystal polyester resins, fluorocarbon resins, syndiotactic polystyrene resins, cyclic polyolefin resins, and the like. These thermoplastic resins can be used alone or in combination of two or more.

The thermosetting resin is a resin having the property that it can be changed to be substantially insoluble or infusible when cured by means such as heating, radiation, or a catalyst. Specific examples thereof include phenol resins, urea resins, melamine resins, benzoguanamine resins, alkyd resins, unsaturated polyester resins, vinyl ester resins, diallyl terephthalate resins, epoxy resins, silicone resins, urethane resins, furan resins, ketone resins, xylene resins, thermosetting polyimide resins, and the like. These thermosetting resins can be used alone or in combination of two or more. In addition, when a main component of a resin of the present invention is a thermoplastic resin, a small amount of thermosetting resin can be added within a range in which the characteristics of the thermoplastic resin are not impaired, and conversely, when a main component is a thermosetting resin, a small amount of thermoplastic resin can be added within a range in which the characteristics of the thermosetting resin are not impaired.

[Mixing Ratio in Resin Composition]

The mixing ratio of cellulose nanofibers in the resin composition is any desired value within a range where the effect of the present invention is not impaired, and the amount of cellulose nanofibers is preferably 0.5% by mass to 30% by mass relative to 100% by mass of a total of the cellulose nanofibers, the fibrillation resin, the curing agent (D), and the dilution resin (E).

[Other Additives]

The resin composition may contain various general known additives according to application within a range in which the effect of the present invention is not impaired, and examples thereof include a hydrolysis inhibitor, a colorant, a flame retardant, an antioxidant, a polymerization initiator, a polymerization inhibitor, an ultraviolet absorber, an antistatic agent, a lubricant, a mold releasing agent, an antifoaming agent, a leveling agent, a photostabilizer (for example, hindered amine or the like), an antioxidant, an inorganic filler, an organic filler, and the like.

The resin composition of the present invention can be used as a molding material, a coating material, a paint material, and an adhesive.

[Molding Method]

A method for forming a molded product of the resin composition of the present invention is not particularly limited. In order to produce a plate-shaped product, extrusion molding is generally used, but a plane press can also be used. Besides this, contour extrusion molding, blow molding, compression molding, vacuum molding, injection molding, and the like can be used. In order to produce a film-shaped product, melt extrusion and solution casting can be used. When melt molding is used, inflation film molding, cast molding, extrusion lamination molding, calender molding, sheet molding, fiber molding, blow molding, injection molding, rotational molding, coat molding, and the like can be used. In the case of a resin which is cured by active energy rays, a molded product can be produced by any one of various curing methods using active energy rays.

[Application]

The resin composition of the present invention can be used for various applications. Examples thereof include, but are not limited to, automotive parts, aircraft parts, electronic and electric components, building materials, container and package members, consumer goods, sport and leisure goods, and the like.

EXAMPLES

Embodiments of the present invention are described in further detail below, but the present invention is not limited to these embodiments.

[Synthesis of Modified Epoxy Resin]

Synthesis Example 1

Production of Modified Epoxy Resin 1

In a four-neck glass flask provided with a thermometer, a stirrer, a nitrogen inlet tube, and a cooling tube, 1200 g of EPICLON 830 (bisphenol F epoxy resin) manufactured by DIC Corporation, 191 g of Bis-TMA (dimethylolpropionic acid), and 0.4 g of TPP (triphenylphosphine) serving as a reaction catalyst were charged so that the catalyst content was 300 ppm, followed by reaction at 140° C. for 3 hours. The reaction product was cooled to room temperature to produce modified epoxy resin 1 having an acid value of 1 mgKOH/g or less and a hydroxyl value of 169 mgKOH/g.

Synthesis Example 2

Production of Modified Epoxy Resin 2

In a four-neck glass flask provided with a thermometer, a stirrer, a nitrogen inlet tube, and a cooling tube, 1200 g of EPICLON 830 (bisphenol F epoxy resin) manufactured by DIC Corporation, 597 g of Versatic acid (neodecanoic acid), and 0.5 g of TPP (triphenylphosphine) serving as a reaction catalyst were charged so that the catalyst content was 300 ppm, followed by reaction at 140° C. for 3 hours. The reaction product was cooled to room temperature to produce modified epoxy resin 2 having an acid value of 1 mgKOH/g or less and a hydroxyl value of 112 mgKOH/g.

Synthesis Example 3

Production of Comparative Modified Epoxy Resin

In a four-neck glass flask provided with a thermometer, a stirrer, a nitrogen inlet tube, and a cooling tube, 1000 g of EPICLON 830 (bisphenol F epoxy resin) manufactured by DIC Corporation, 871 g of tall oil fatty acid, and 0.6 g of TPP (triphenylphosphine) serving as a reaction catalyst were charged so that the catalyst content was 300 ppm, followed by reaction at 140° C. for 24 hours. The reaction product was cooled to room temperature to produce a comparative modified epoxy resin having an acid value of 1 mgKOH/g or less and a hydroxyl value of 88 mgKOH/g.

Synthesis Example 4

Production of Modified Epoxy Resin 3

In a four-neck glass flask provided with a thermometer, a stirrer, a nitrogen inlet tube, and a cooling tube, 1400 g of EPICLON 850 (bisphenol A epoxy resin) manufactured by DIC Corporation, 203 g of Bis-TMA (dimethylolpropionic acid), and 0.48 g of TPP (triphenylphosphine) serving as a reaction catalyst were charged so that the catalyst content was 300 ppm, followed by reaction at 140° C. for 3 hours. The reaction product was cooled to room temperature to produce modified epoxy resin 3 having an acid value of 1 mgKOH/g or less and a hydroxyl value of 155 mgKOH/g.

Synthesis Example 5

Production of Modified Epoxy Resin 4

In a four-neck glass flask provided with a thermometer, a stirrer, a nitrogen inlet tube, and a cooling tube, 1400 g of EPICLON 830 (bisphenol F epoxy resin) manufactured by DIC Corporation, 334 g of Bis-TMA (dimethylolpropionic acid), and 0.52 g of TPP (triphenylphosphine) serving as a reaction catalyst were charged so that the catalyst content was 300 ppm, followed by reaction at 140° C. for 5 hours. The reaction product was cooled to room temperature to produce modified epoxy resin 4 having an acid value of 1 mgKOH/g or less and a hydroxyl value of 300 mgKOH/g.

[Measurement of Acid Value]

An acid value represents a weight (mg) of potassium hydroxide necessary for neutralizing 1 g of modified epoxy resin, and the unit is mgKOH/g.

An acid value was determined by dissolving the modified epoxy resin in methyl ethyl ketone and titrating with a 0.1 N potassium hydroxide methanol solution.

[Measurement of Hydroxyl Value]

A hydroxyl value represents a weight (mg) of the same number of moles of potassium hydroxide as that of OH groups in 1 g of modified epoxy resin, and the unit is mgKOH/g.

A hydroxyl value was determined from an area ratio of a peak due to hydroxyl groups in a 13C-NMR spectrum. 13C-NMR quantitative measurement was performed by a gate decoupling method using JNM-LA300 manufactured by JEOL Ltd. as a measuring apparatus and a solution prepared by adding 10 mg of Cr(acac)3 as a buffer reagent to a 10 wt % deuterated chloroform solution of a sample. The number of acquisitions was 4000.

[Method for Fibrillating Cellulose Using Modified Epoxy Compound]

Example 1

In a pressure kneader (DS1-5GHH-H) manufactured by Moriyama Co., Ltd., 450 g of the modified epoxy resin 1 synthesized in Synthesis Example 1 and 550 g of cellulose powder product "KC Flock W-50GK" manufactured by Nippon Paper Chemicals Co., Ltd. were charged, and cellulose was fibrillated by pressure kneading at 60 rpm for 240 minutes to produce a master batch 1 including a mixture of the modified epoxy resin 1 and cellulose nanofibers. Then, 0.1 g of the master batch 1 was weighed, suspended in acetone so that a concentration was 0.1%, and dispersed at 15000 rpm for 20 minutes by using TK homomixer type A manufactured by Tokushu Kikai Kogyo Co., Ltd. The resultant dispersion was spread on a glass and dried to remove acetone, and a fibrillated state of the cellulose was observed with a scanning electron microscope. It was found that the cellulose is mostly fibrillated to a length of 100 nm or less in the fiber short-axis direction, and thus the cellulose is satisfactorily fibrillated.

Example 2

In a pressure kneader (DS1-5GHH-H) manufactured by Moriyama Co., Ltd., 350 g of the modified epoxy resin 2 synthesized in Synthesis Example 2 and 650 g of cellulose powder product "KC Flock W-50GK" manufactured by Nippon Paper Chemicals Co., Ltd. were charged, and cellulose was fibrillated by pressure kneading at 60 rpm for 240 minutes to produce a master batch 2 including a mixture of the modified epoxy resin 2 and cellulose nanofibers. Then, 0.1 g of the master batch 2 was weighed, suspended in acetone so that a concentration was 0.1%, and dispersed at 15000 rpm for 20 minutes by using TK homomixer type A manufactured by Tokushu Kikai Kogyo Co., Ltd. The resultant dispersion was spread on a glass and dried to remove acetone, and a fibrillated state of the cellulose was observed with a scanning electron microscope. It was found that the cellulose is mostly fibrillated to a length of 100 nm or less in the fiber short-axis direction, and thus the cellulose is satisfactorily fibrillated.

Comparative Example 1

In a pressure kneader (DS1-5GHH-H) manufactured by Moriyama Co., Ltd., 400 g of the comparative modified epoxy resin synthesized in Synthesis Example 3 and 600 g of cellulose powder product "KC Flock W-50GK" manufactured by Nippon Paper Chemicals Co., Ltd. were charged, and cellulose was fibrillated by pressure kneading at 60 rpm for 240 minutes to produce a comparative master batch including a mixture of a master batch and cellulose. Then, 0.1 g of the resultant comparative master batch 1 was weighed, suspended in acetone so that a concentration was 0.1%, and dispersed at 15000 rpm for 20 minutes by using TK homomixer type A manufactured by Tokushu Kikai Kogyo Co., Ltd. The resultant dispersion was spread on a glass and dried to remove acetone, and a fibrillated state of the cellulose was observed with a scanning electron microscope. It was found that the cellulose is little fibrillated to a length of 100 nm or less in the fiber short-axis direction to produce fibers mostly having a length of 1 μm or more, and thus the fibrillation of cellulose does not proceed.

Example 3

[Production of Resin Composition]

First, 3.5 g of the master batch 1 produced in Example 1 was mixed with 100.0 g of epoxy resin EPICLON 830 manufactured by DIC Corporation. Mixing was performed at 12000 rpm for 30 minutes by using stirring apparatus Labolution manufactured by Primix Corporation which was provided with Neomixer stirring blade type 4-2.5 manufactured by Primix Corporation. The resultant mixture was cooled to room temperature, and then 100.0 g of methyltetrahydrophthalic anhydride (EPICLON B-570H manufactured by DIC Corporation) serving as a curing agent and 1.0 g of N,N-dimethylbenzylamine manufactured by Tokyo Chemical Industry Co., Ltd. were added to the mixture and further stirred, thereby producing resin composition 1. The content of cellulose nanofibers in the resin composition 1 was 1.0% by mass.

[Formation of Molded Plate and Specimen]

The resin composition 1 was deaerated in a vacuum chamber, poured into a mold, and then cured by heating at 110° C. for 3 hours. Then, after-curing was performed at 175° C. for 5 hours to produce a cast molded plate having a thickness of 6 mm. In the molded plate, no aggregates were observed. According to the standards of ASTM D-5045 (3-point bending specimen (SENB)), specimens (the specimen with height W=12.7 mm, width B=6 mm, notch and pre-crack size a=0.45 to 0.55 W) were obtained with N=8 from the molded plate.

[Fracture Toughness Test]

A 3-point bending test was carried out by using a universal tester manufactured by Instron Corporation under the conditions of a span of 50.8 mm and a head speed of 10 mm/min according to ASTM D-5045. After it was confirmed by a predetermine method that a load-displacement curve is within a linear range, a fracture toughness value was calculated. An average fracture toughness value (test number: 8) was 0.8296 (MPa·√m).

Example 4

A resin composition 2 was produced by the same operation as in Example 3 except that in Example 3, 3.5 g of the master batch 1 produced in Example 1 was changed to 3.0 g of the master batch 2 produced in Example 2. The content of cellulose nanofibers in the resin composition 2 was 1.0% by mass.

A molded plate and specimens were formed by the same method as in Example 3, and a fracture toughness test was conducted by the same method as in Example 3. Aggregates were not observed in a molded plate formed from the resin composition 3. A fracture toughness value of the molded plate was 0.8012 (MPa·√m).

Comparative Example 2

A resin composition 3 was produced by mixing 100.0 g of epoxy resin EPICLON 830 manufactured by DIC Corporation, 100.0 g of methyltetrahydrophthalic anhydride (EPICLON B-570H manufactured by DIC Corporation), and 1.0 g of N,N-dimethylbenzylamine manufactured by Tokyo Chemical Industry Co., Ltd. Mixing was performed by using stirring apparatus Labolution manufactured by Primix Corporation which was provided with Neomixer stirring blade type 4-2.5 manufactured by Primix Corporation.

A molded plate and specimens were formed by the same method as in Example 3, and a bending test was conducted by the same method as in Example 3. Aggregates were not observed in a molded plate formed from the resin composition 3. A fracture toughness value of the molded plate was 0.6869 (MPa·√m).

Comparative Example 3

A resin composition 4 was produced by the same operation as in Example 3 except that in Example 3, 3.5 g of the master batch 1 produced in Example 1 was changed to 3.2 g of the comparative master batch produced in Comparative Example 1. The content of cellulose nanofibers in the resin composition 4 was 1.0% by mass.

A molded plate and specimens were formed by the same method as in Example 3, and a bending test was conducted by the same method as in Example 3. Aggregates were observed in a molded plate formed from the resin composition 4. A fracture toughness value of the molded plate was 0.7239 (MPa·√m).

Example 5

In a pressure kneader (DS1-5GHH-H) manufactured by Moriyama Co., Ltd., 500 g of the modified epoxy resin 3 synthesized in Synthesis Example 4 and 500 g of cellulose powder product "KC Flock W-50GK" manufactured by Nippon Paper Chemicals Co., Ltd. were charged, and cellulose was fibrillated by pressure kneading at 60 rpm for 360 minutes to produce a master batch 3 including a mixture of the modified epoxy resin 3 and cellulose nanofibers. Then, 0.1 g of the master batch 3 was weighed, suspended in acetone so that a concentration was 0.1%, and dispersed at 15000 rpm for 20 minutes by using TK homomixer type A manufactured by Tokushu Kikai Kogyo Co., Ltd. The resultant dispersion was spread on a glass and dried to remove acetone, and a fibrillated state of the cellulose was observed with a scanning electron microscope. It was found that the cellulose is mostly fibrillated to a length of 100 nm or less in the fiber short-axis direction, and thus the cellulose is satisfactorily fibrillated.

Example 6

In a pressure kneader (DS1-5GHH-H) manufactured by Moriyama Co., Ltd., 500 g of the modified epoxy resin 4 synthesized in Synthesis Example 5 and 500 g of cellulose powder product "KC Flock W-50GK" manufactured by Nippon Paper Chemicals Co., Ltd. were charged, and cellulose was fibrillated by pressure kneading at 60 rpm for 240 minutes to produce a master batch 4 including a mixture of the modified epoxy resin 3 and cellulose nanofibers. Then, 0.1 g of the master batch 4 was weighed, suspended in acetone so that a concentration was 0.1%, and dispersed at 15000 rpm for 20 minutes by using TK homomixer type A manufactured by Tokushu Kikai Kogyo Co., Ltd. The resultant dispersion was spread on a glass and dried to remove acetone, and a fibrillated state of the cellulose was observed with a scanning electron microscope. It was found that the cellulose is mostly fibrillated to a length of 100 nm or less in the fiber short-axis direction, and thus the cellulose is satisfactorily fibrillated.

Example 7

A resin composition 5 was produced by the same operation as in Example 3 except that in Example 3, 3.5 g of the master batch 1 produced in Example 1 was changed to 4.1 g of the master batch 3 produced in Example 5. The content of cellulose nanofibers in the resin composition 5 was 1.0% by mass.

A molded plate and specimens were formed by the same method as in Example 3, and a fracture toughness test was conducted by the same method as in Example 3. Aggregates were not observed in a molded plate formed from the resin composition 5. A fracture toughness value of the molded plate was 0.7649 (MPa·√m).

Example 8

A resin composition 5 was produced by the same operation as in Example 3 except that in Example 3, 3.5 g of the master batch 1 produced in Example 1 was changed to 4.1 g of the master batch 4 produced in Example 6. The content of cellulose nanofibers in the resin composition 5 was 1.0% by mass.

A molded plate and specimens were formed by the same method as in Example 3, and a fracture toughness test was conducted by the same method as in Example 3. Aggregates were not observed in a molded plate formed from the resin composition 5. A fracture toughness value of the molded plate was 0.7560 (MPa·√m).

The results of Examples 3, 4, 7, and 8 and Comparative Examples 2 and 3 are summarized in Table 1.

Also, a resin composition having enhanced mechanical strength can be produced by using the fibrillated cellulose nanofibers and a master batch. Therefore, the present invention has industrial applicability.

The invention claimed is:

1. A method for producing cellulose nanofibers, the method comprising
    fibrillating cellulose in a modified epoxy resin (A) having a hydroxyl value of 100 mgKOH/g or more; wherein the cellulose is fibrillated to a length of 100 nm or less in the fiber short-axis direction.

2. The method for producing cellulose nanofibers according to claim 1, wherein the modified epoxy compound (A) is produced by reacting an epoxy resin (B) with a compound (C) having a carboxyl group or an amino group.

3. The method for producing cellulose nanofibers according to claim 2, wherein the compound (C) having a carboxyl group or an amino group is a compound further having a hydroxyl group.

4. Cellulose nanofibers produced by the method for producing cellulose nanofibers according to claim 3.

5. A master batch comprising the cellulose nanofibers according to claim 4 and the modified epoxy resin (A).

6. A resin composition comprising the master batch according to claim 5 and a curing agent (D).

7. Cellulose nanofibers produced by the method for producing cellulose nanofibers according to claim 2.

8. A master batch comprising the cellulose nanofibers according to claim 7 and the modified epoxy resin (A).

9. A resin composition comprising the master batch according to claim 8 and a curing agent (D).

10. The resin composition according to claim 9, further comprising a dilution resin (E).

11. Cellulose nanofibers produced by the method for producing cellulose nanofibers according to claim 1.

12. A master batch comprising the cellulose nanofibers according to claim 11 and the modified epoxy resin (A).

13. A resin composition comprising the master batch according to claim 12 and a curing agent (D).

14. A molded product produced by molding the resin composition according to claim 13.

TABLE 1

| | | Example 3 | Example 4 | Example 7 | Example 8 | Comparative Example 2 | Comparative Example 3 |
|---|---|---|---|---|---|---|---|
| Composition | Master batch 1 | 3.5 | | | | | |
| | Master batch 2 | | 3.0 | | | | |
| | Master batch 3 | | | 4.1 | | | |
| | Master batch 4 | | | | 4.1 | | |
| | Comparative master batch | | | | | | 3.2 |
| | EP830 | 100.0 | 100.0 | 100.0 | 100.0 | 100.0 | 100.0 |
| | B-570H | 100.0 | 100.0 | 100.0 | 100.0 | 100.0 | 100.0 |
| | N,N-dimethylbenzyl amine | 1.0 | 1.0 | 1.0 | 1.0 | 1.0 | 1.0 |
| Content of cellulose in composition (% by weight) | | 1.0% | 1.0% | 1.0% | 1.0% | 1.0% | 1.0% |
| Aggregate in composition | | No | No | No | No | No | Yes |
| Fracture toughness of molded product (MPa · √m) | | 0.8296 | 0.8012 | 0.7649 | 0.7560 | 0.6869 | 0.7239 |

INDUSTRIAL APPLICABILITY

According to the present invention, cellulose nanofibers can be produced by fibrillating cellulose in a modified epoxy resin having a hydroxyl value of 100 mgKOH/g or more.

15. The resin composition according to claim 13, further comprising a dilution resin (E).

16. A molded product produced by molding the resin composition according to claim 15.

* * * * *